(12) United States Patent
Boss et al.

(10) Patent No.: US 7,656,294 B2
(45) Date of Patent: Feb. 2, 2010

(54) DISABLEMENT OF CAMERA FUNCTIONALITY FOR A PORTABLE DEVICE

(75) Inventors: Gregory J. Boss, American Fork, UT (US); John J. Gontkof, Melbourne, FL (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 12/167,351

(22) Filed: Jul. 3, 2008

(65) Prior Publication Data

US 2008/0267614 A1 Oct. 30, 2008

Related U.S. Application Data

(63) Continuation of application No. 11/462,388, filed on Aug. 4, 2006, now Pat. No. 7,414,529.

(51) Int. Cl.
*G08B 21/00* (2006.01)
*H04M 1/66* (2006.01)

(52) U.S. Cl. .................... 340/540; 455/410
(58) Field of Classification Search .............. 340/572.1, 340/5.2, 5.8, 5.74, 573.1, 573.4, 540, 506, 340/539.13, 988; 455/410, 411, 418–420; 34/207.99, 211.99
See application file for complete search history.

(56) References Cited

U.S. PATENT DOCUMENTS 6,493,022 B1   12/2002   Ho et al.
6,496,531 B1*  12/2002   Kamel et al. ................. 375/130
6,694,143 B1*   2/2004   Beamish et al. .......... 455/456.1
6,970,724 B2*  11/2005   Leung ......................... 455/567
7,286,834 B2   10/2007   Walter
7,336,172 B2*   2/2008   Govindaraj .................. 340/541
2003/0133573 A1  7/2003   Himmel et al.
2003/0174242 A1  9/2003   Carmi
2004/0185900 A1  9/2004   McElveen
2005/0030384 A1*  2/2005   Lee et al. ................ 348/207.99
2005/0064856 A1*  3/2005   Atkin et al. .................. 455/418
2006/0019645 A1  1/2006   Azimi et al.
2008/0108324 A1*  5/2008   Moshir et al. ................ 455/411
2008/0117032 A1*  5/2008   Dillon ...................... 340/426.1

* cited by examiner

*Primary Examiner*—Benjamin C Lee
*Assistant Examiner*—Sigmund Tang
(74) *Attorney, Agent, or Firm*—William H. Steinberg; Schubert Osterrieder & Nickelson PLLC

(57) ABSTRACT

Systems, methods, media, and apparatuses for disabling camera functionality in a portable device are disclosed. Embodiments of the method may include establishing a connection with a camera-enabled portable device and transmitting to the portable device a request for permission to disable camera functionality. Embodiments of the method may also include receiving a response from the portable device relating to permission to disable camera functionality. Further embodiments of the method may include, in response to receiving permission to disable camera functionality, transmitting to the portable device a command to disable camera functionality or, in response to receiving an indication that the user refused permission, displaying a notification message. The command to disable camera functionality may include a command to disable camera functionality for a prescribed period, while the portable device is located within a secure geographical location, partially or fully disable camera functionality, and/or other methodology.

9 Claims, 8 Drawing Sheets

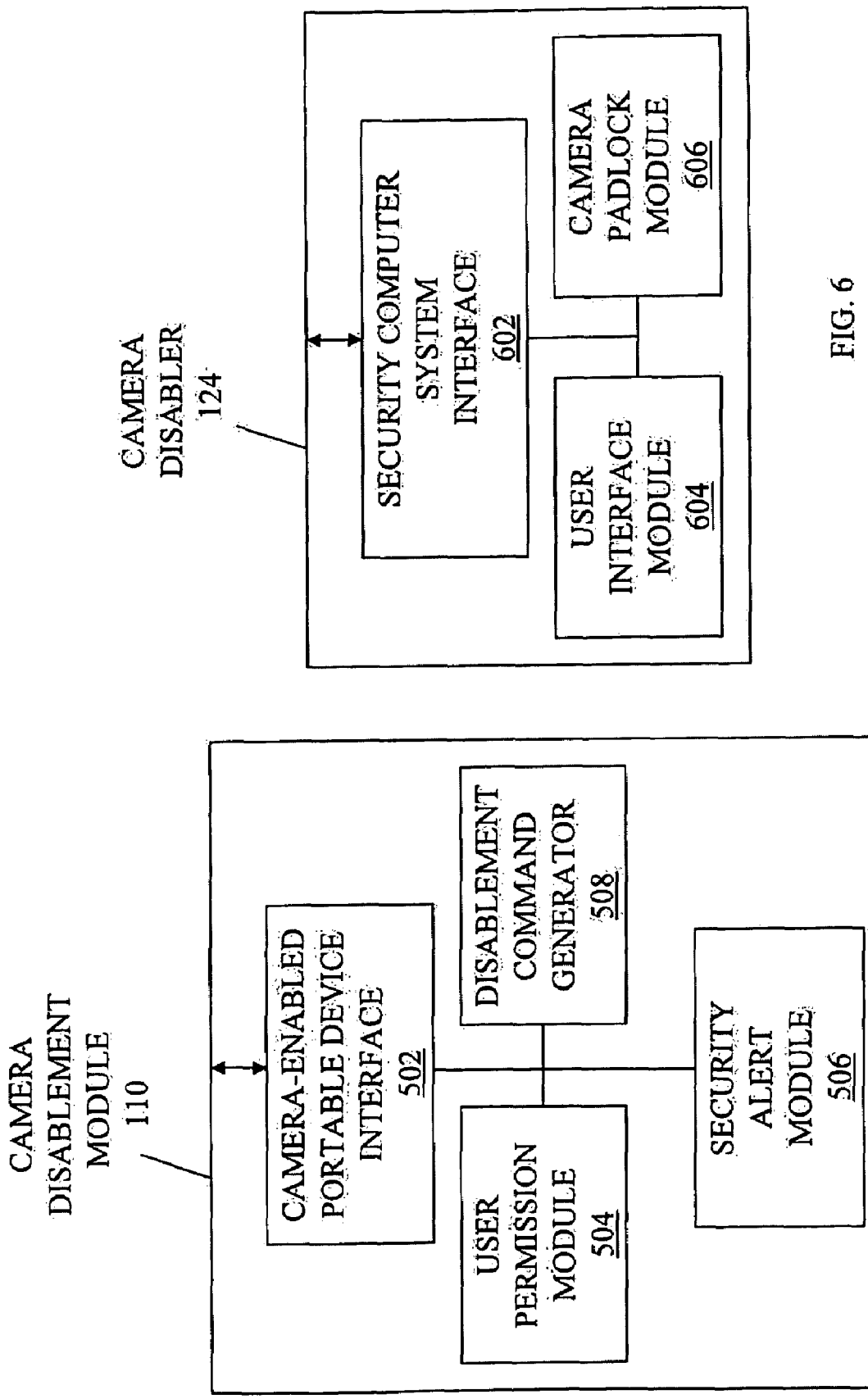

DISABLEMENT OF CAMERA FUNCTIONALITY FOR A PORTABLE DEVICE

CROSS-REFERENCES TO RELATED APPLICATION(S)

Pursuant to 35 USC §120, this continuation application claims priority to and benefit of U.S. patent application Ser. No. 11/462,388, entitled "DISABLEMENT OF CAMERA FUNCTIONALITY FOR A PORTABLE DEVICE", filed on Aug. 4, 2006, the disclosure of which is incorporated herein in its entirety for all purposes.

BACKGROUND OF THE INVENTION

The present invention is in the field of data processing systems and, in particular, to systems, methods, media, and apparatuses for disabling camera functionality in a portable device such as a mobile phone.

Portable electronic devices have become ubiquitous in modern society. Mobile phones, in particular, continue to dramatically increase in usage as costs are lowered, functionality is improved, and the availability of alternatives such as pay phones has decreased. These mobile phones (also known as cell phones) allow users to have greater mobility while still maintaining communication with friends, co-workers, or others. Many users carry their mobile phones with them at all times, including while at work, at home, on vacation, or anywhere else. The mobile phone market is highly competitive and manufacturers and providers continually add new features, and enhance existing ones, to make mobile phones an all-in-one communication and media device.

One specific feature that is now common on most mobile phones is a digital camera and/or camcorder to record still or video pictures. The amount of photographs or video that can be recorded is typically only limited by the memory of the device. Camera resolution is also being enhanced, with many models delivering high-resolution photographs of two megapixels (2 MP) or more. By using additional memory cards, a user can now capture hours of video or hundreds of photographs using their mobile phone or other portable electronic device.

The ability of users to easily record photographs and/or video on handheld devices presents a significant new kind of security challenge for businesses, corporate facilities, or other locations where picture taking is typically strictly prohibited or otherwise limited. These types of locations may include museums, factories, government facilities, or office buildings as typical examples. For many of these locations, the security risk is that portable device users can easily copy and misappropriate trade secret or other corporate proprietary information. For other locations, security personnel may be concerned that users threaten the privacy of others, present a terrorism threat, threaten a commercial interest or copyright interest because of misappropriation of images (e.g., concert venues or museums), or other risk. The increasing prevalence and variety of camera-enabled portable devices presents security personnel with a constantly changing security threat.

Currently, security personnel must determine which devices may present a security threat and which devices are permissible, a process which may prove difficult as more and more devices become enabled with still or video cameras. Security personnel often collect those devices which they determine to present a security threat at a front entrance or security desk and allow the owner to pick up their confiscated device when they leave the secure facility. This prevents users of confiscated devices from using their cameras in the secured facility. This approach can be flawed from a security standpoint, however, as security personnel may not catch all cameras entering the facility. From the standpoint of users, this approach is also flawed as the user must remember to pick up their camera-enabled device when the leave the facility. More importantly for some users, they must also be without their camera-enabled device and all of its other functionality while they are in the facility. For a user that relies on their mobile phone for many purposes, the requirement to leave their mobile phone at the security desk can be onerous as the user cannot make or receive calls from the phone, may be without calendaring functions or contact lists, or may lose access to other features embedded in the device. The burden on the user may encourage some users to attempt to smuggle their mobile phones in the facility, increasing the security risk. There is, therefore, a need for an effective and efficient solution for securing camera-enabled portable devices in certain locations.

BRIEF SUMMARY OF THE INVENTION

The problems identified above are in large part addressed by systems, methods, media, and apparatuses for disabling camera functionality in a portable device. Embodiments may include a method for disabling camera functionality of a portable device. Embodiments of the method may include establishing a connection with a camera-enabled portable device and transmitting to the portable device a request for permission to disable camera functionality. Embodiments of the method may also include receiving a response from the portable device relating to permission to disable camera functionality. Further embodiments of the method may include, in response to receiving permission to disable camera functionality, transmitting to the portable device a command to disable camera functionality. The command to disable camera functionality may include a command to disable camera functionality for a prescribed period, a command to disable camera functionality while the portable device is located within a secure geographical location, a command to partially or fully disable camera functionality, or other methodology. Further embodiments of the method may also include, in response to receiving an indication that the user refused permission to disable camera functionality, displaying a notification message.

Another embodiment provides a machine-accessible medium containing instructions effective, when executing in a data processing system, to cause the system to perform a series of operations for disabling camera functionality of a portable device. The series of operations may generally include establishing a connection with a camera-enabled portable device and transmitting to the portable device a request for permission to disable camera functionality. Embodiments of the series of operations may also include receiving a response from the portable device relating to permission to disable camera functionality and, in response to receiving permission to disable camera functionality, transmitting to the portable device a command to disable camera functionality. Further embodiments of the series of operations may also include, in response to receiving an indication that the user refused permission to disable camera functionality, displaying a notification message.

A further embodiment provides a camera disablement module apparatus for a security computer system. The camera disablement module may generally include a camera-enable portable device interface to facilitate communication to and from a camera-enabled portable device and a user permission module to request and receive permission from a user of the portable device to disable camera functionality. The camera disablement module may also generally include a disablement command generator to generate and transmit a request to disable camera functionality of the portable device. A further embodiment of the camera disablement module may also include a security alert module to notify security personnel in response to the user refusing permission to disable camera functionality. The disablement command generator may transmit a disablement command in response to receiving from the user permission module an indication that the user granted permission to disable camera functionality. The disablement command may include commands to disable camera functionality while the portable device is located within a secure geographical location, to disable camera functionality for a prescribed period, to partially disable camera functionality, and/or to fully disable camera functionality.

A further embodiment provides a method for disabling camera functionality of a portable device. Embodiments of the method may include receiving from a security computer system a request for permission to disable camera functionality, querying a user for permission to disable camera functionality, and receiving a response to the query from the user, where the user response includes an indication of whether the user granted or refused permission to allow disablement of camera functionality of the portable device. Embodiments of the method may also include, in response to the user granting permission to allow disablement of camera functionality, disabling at least part of the camera functionality of the portable device. Further embodiments of the method may include, in response to the user refusing permission to allow disablement of camera functionality, transmitting an indication of the user response to the security computer system.

BRIEF DESCRIPTION OF THE SEVERAL VIEWS OF THE DRAWINGS

Aspects of the invention will become apparent upon reading the following detailed description and upon reference to the accompanying drawings in which, like references may indicate similar elements:

FIG. 5 depicts a conceptual illustration of software components of a camera disablement module of a security computer system according to one embodiment;

FIG. 6 depicts a conceptual illustration of software components of a camera disabler of a portable device according to one embodiment;

DETAILED DESCRIPTION OF THE INVENTION

Figure 1:
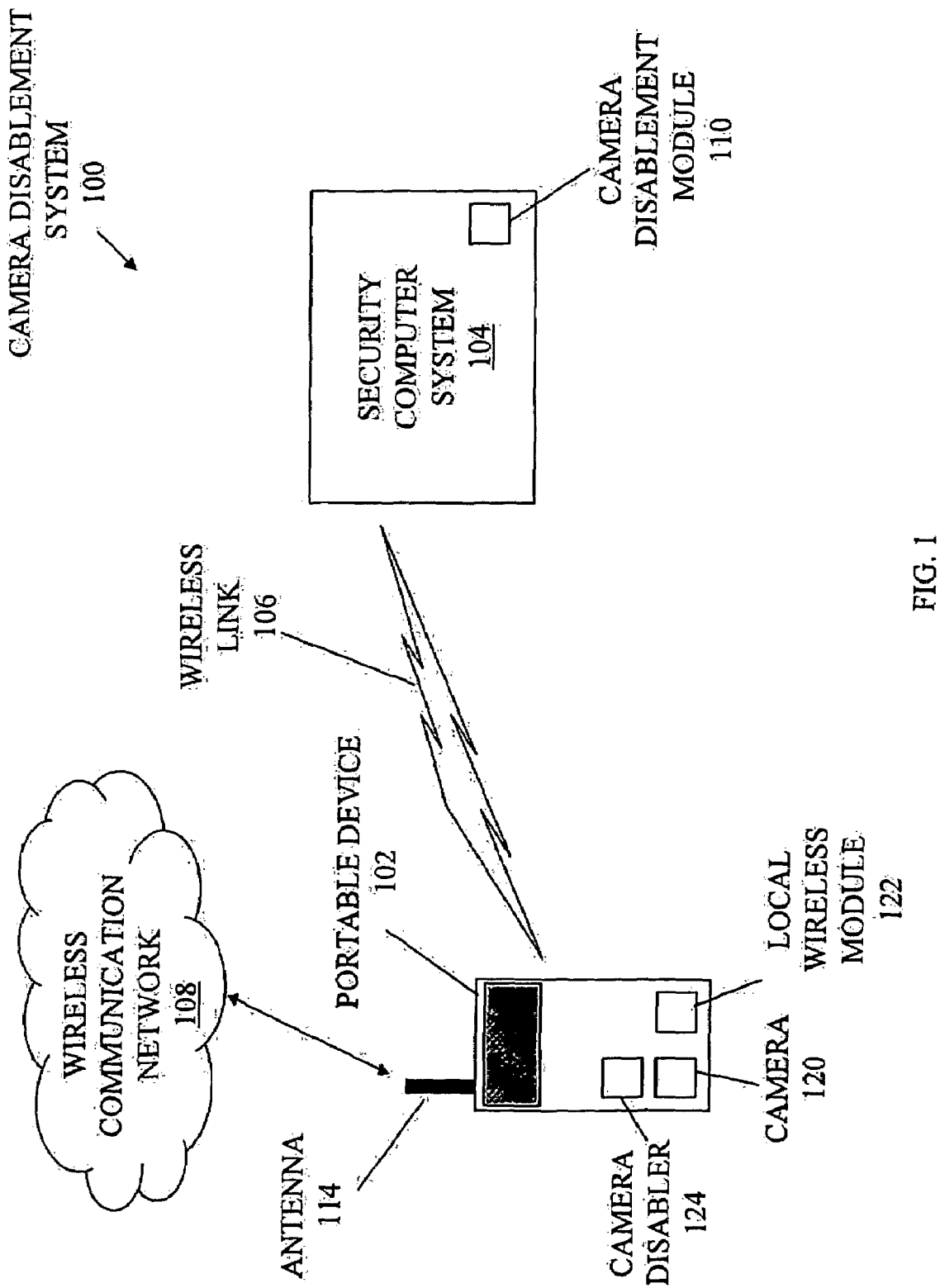
FIG. 1 depicts an environment for a camera disablement system with a camera-enabled portable device and a security computer system according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods, media, and apparatuses for disabling camera functionality in a portable device are disclosed. Embodiments of the method may include establishing a connection with a camera-enabled portable device and transmitting to the portable device a request for permission to disable camera functionality. Embodiments of the method may also include receiving a response from the portable device relating to permission to disable camera functionality. Further embodiments of the method may include, in response to receiving permission to disable camera functionality, transmitting to the portable device a command to disable camera functionality. The command to disable camera functionality may include a command to disable camera functionality for a prescribed period, a command to disable camera functionality while the portable device is located within a secure geographical location, a command to partially or fully disable camera functionality, or other methodology. Further embodiments of the method may also include, in response to receiving an indication that the user refused permission to disable camera functionality, displaying a notification message.

The system and methodology of the disclosed embodiments may provide an efficient and effective mechanism for disabling camera functionality of portable devices such as mobile phones. By negotiating with a user of a camera-enabled portable device for permission to disable their camera functionality, the disclosed system may satisfy both organizational security concerns (by disabling camera functionality) as well as personal security concerns (by only disabling the camera functionality with a user's permission). For security personnel, the disclosed system may, in some embodiments, provide for automatic detection and disablement of camera functionality and may also provide for alerts in the event users deny permission to disable their cameras. The portable device user's experience may also be improved as the user need not leave their portable device at a security desk, losing its non-camera functionality while in a secure facility, or be forced to purchase a portable device that does not have camera functionality. The user's experience may also be improved by automatic termination of the camera function disablement in some embodiments, eliminating the need for a user to return to a security desk to have functionality enabled to 'check out' upon leaving a facility, a task which may easily be forgotten.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a camera disablement system with a camera-enabled portable device and a security computer system according to one embodiment. The camera disablement system 100 of FIG. 1 may be particularly suitable for situations where users entering a geographical location for which the operators desire to limit camera functionality (e.g., corporate research facility, museum, etc.) pass by one or more security areas. The disclosed camera disablement system 100 includes a portable device 102 in communication with a security computer system 104 via a wireless link 106. As will be described in more detail subsequently, the user of a portable device 102 may agree with a request by the security computer system 104 to disable the camera functionality of the portable device 102. The user may then enter the secure area with which the security computer system 104 is associated while retaining their portable device 102, allowing the user to use the portable device 102 for any of its functions except for recording images or video with a camera. If a user of a portable device 102 does not agree with the disablement, the security computer system 104 may notify security personnel for the appropriate action (e.g., confiscation of the portable device 102, refusing entry, etc.).

The portable device 102 may include any type of camera-enabled electronic device, such as camera-enabled mobile phones (such as cell phones or satellite phones), personal digital assistants (PDAs), portable computers (such as notebook, laptop, handheld, or wearable computers), gaming platform, or other devices. In other embodiments, the camera-enabled portable device 102 may be a camera or camcorder, such as a digital camera. As depicted in FIG. 1 (and as described in more detail in relation to FIG. 3), portable device 102 is a mobile phone with an antenna 114 for transmission and receipt of information with a wireless communication network 108. The wireless communication network 108 may include any data communication channel (or combinations of channels) that allow voice communication between a wireless phone portable device 102 and another phone, such as a cellular telephone network. In one example where wireless communication network 108 includes a cellular network, the portable device 102 may be in wireless communication with a base station, which in turn may be in communication with a mobile switching center, gateway mobile switching center (GMSC), or other elements of a cellular network (and all part of the wireless communication network 108). In some embodiments, a wireless communication network 108 may include both a wireless network and a telephone network in communication via a GMSC.

In addition to the optional connection to a wireless communication network 108, the portable device 102 may communicate with the security computer system 104 via a wireless link 106 or other data communication channel. Wireless link 106 may be any technology that allows devices to wirelessly communicate with other devices, such as radio frequency (RF)-based wireless protocols such as the Institute of Electrical and Electronic Engineers (IEEE) 802.11 standard, the Bluetooth wireless protocol standard (IEEE 802.15.1), ZigBee standard (IEEE 802.15.4), Radio Frequency Identification (RFID) standard, or other RF standard. For portable devices 102 without wireless networking capability, a user and/or security personnel may connect the portable device 102 to the security computer system 104 via a wired link such as a Universal Serial Bus (USB) or other cable link. Those skilled in the art will recognize, however, that other types of data communication channels may be used to facilitate communication between portable device 102 and security computer system 104 without departure from the scope and spirit of the invention.

The disclosed portable device 102 includes a camera 120, an optional local wireless module 122, and a camera disabler 124. Camera 120 may include any camera for recording still or video images. Camera 120 may store recorded images or video on dedicated storage or may utilize other memory of the portable device 102, including removable flash memory cards such as Secure Digital (SD) cards. Portable device 102 may also include a local wireless module 122 (e.g., a Bluetooth module, an 802.11 module, a ZigBee module, etc.) to establish a wireless link 106 with other wireless-enabled devices such as security computer system 104. As will be described in more detail in relation to FIG. 6, the camera disabler 124 may interact with the security computer system 104 (such as via the local wireless module 122) to receive a request for permission to disable the camera 120 of the portable device 102, may interact with the user of the portable device 102 to seek such permission (such as through a user interface), and may transmit an indication of the user's response to the security computer system 104 and/or disable the camera 120. A user of a portable device 102 equipped with a camera disabler 124 may thus agree to have their camera functionality disabled (in a 'virtual padlock') while they are in a secure location. As will be described in more detail, the camera functionality disablement may terminate after a prescribed time, upon the user returning to the security desk for reactivation, upon leaving the facility, or other means. The camera disabler 124 may be a combination of hardware, software, and/or firmware, and in some embodiments many of its functions may be performed by firmware originally installed on the portable device 102 or downloaded at a later date.

The security computer system 104 may be any computer system adapted to interact with portable devices 102, such as one or more personal computers, workstations, servers, mainframe computers, notebook or laptop computers, desktop computers, or other computer systems. In some embodiments, the security computer system 104 may be a computer system as described in relation to FIG. 4 and may be in wired or wireless communication with a portable device 102. An example security computer system 104 may be an International Business Machine Corporation (IBM) eServer® server or similar server having one or more processors, or threads of processors, executing software and/or one or more state machines coupled with data storage devices such as RAM, ROM, flash memory, compact disk drives, hard drives, and the like.

The security computer system 104 may include a camera disablement module 110 to interact with camera disablers 124 of one or more portable devices 102. The camera disablement module 110, which is described in more detail in relation to FIG. 5, may transmit a request for permission to disable the camera functionality of a portable device 102 upon request, automatically, upon detection of the camera-enabled portable device 102, or other methodology. The security computer system 104 may then receive an indication of the user's response to the request for permission, which may include granting full or partial permission or a refusal of permission. Upon receiving no response or an indication that the user refused permission, the security computer system 104 and its camera disablement module 110 may notify security personnel that the portable device 102 still has camera functionality enabled and thus presents a potential security risk. Security personnel may then optionally confiscate the portable device 102. Upon receiving an indication that camera functionality has already been disabled, the camera disablement module 110 may, for example, record an indication of the disablement in a log. Upon receiving an indication that the user granted permission, the camera disablement module 110 may also, in some embodiments, generate and transmit a disablement command to the portable device 102.

The camera disablement module 110 may disable, or request disablement, camera functionality for a prescribed period (e.g., for as long as the user is authorized to be in the facility) or an indefinite period (requiring the user to return to the security computer system 104 upon leaving the facility to have functionality restored). The camera disablement module 110 may also optionally partially disable camera functionality, such as by allowing for photographs to be taken in exchange for a fee or by only allowing low resolution photographs. The security computer system 104 may accordingly adjust its response based on each portable device 102 and how the user of each device responds to the request for permission, providing a flexible mechanism to manage the camera functionality of camera-enabled portable devices 102 within a facility or other location associated with the security computer system 104.

The disclosed system and methodology may also provide additional features. Users of camera-enabled portable devices 102 may optionally be provided knowledge of what entity is requesting permission for disable camera functionality, which may assist in preventing malicious activities by hackers. Moreover, the disclosed system, the disclosed system may provide for variable control based on subsets or groups of people. This may be accomplished, for example, by defining users in a security computer system 104 that are 'trusted' or have legitimate business purposes to use a camera, have paid necessary fees for photographic privileges, etc.

Figure 2:
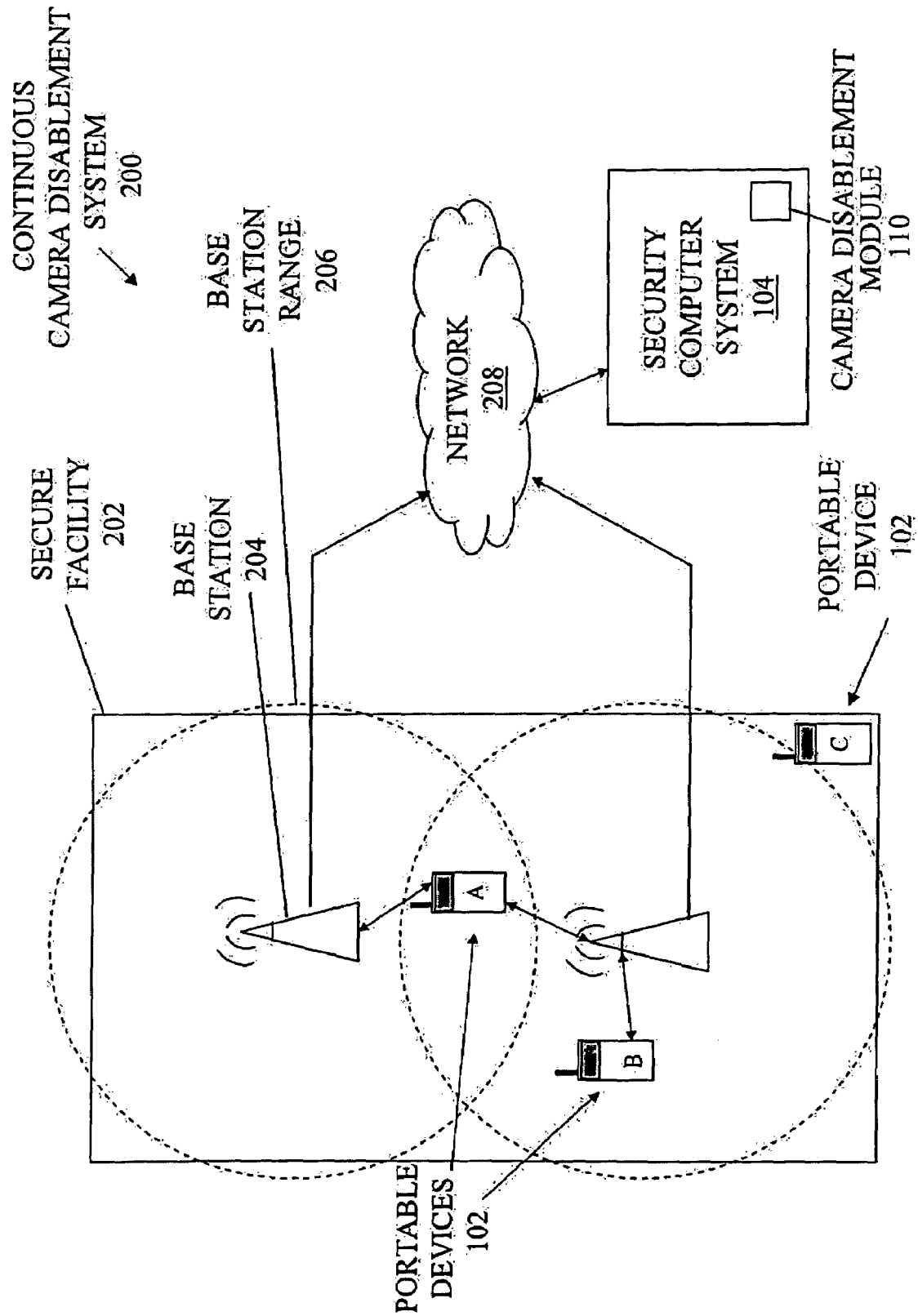
FIG. 2 depicts an environment for a continuous camera disablement system with a security computer system and a plurality of base stations for a secure facility according to one embodiment.

FIG. 2 depicts an environment for a continuous camera disablement system with a security computer system and a plurality of base stations for a secure facility according to one embodiment. The continuous camera disablement system 200 of FIG. 2, as will be described in more detail subsequently, may provide a continuous wireless 'footprint' over a secure facility 202 that allows a security computer system 104 to disable any camera-enabled portable devices 102 within the secure facility 202 upon agreement by the users of the portable devices 102. The continuous camera disablement system 200 may be particularly suitable for situations without a defined main security desk or with multiple entrances, making the camera disablement system 100 of FIG. 1 less desirable as multiple security computer systems 104 would be required. Moreover, the continuous camera disablement system 200 may help detect and disable portable devices 102 that are turned on while the user is within the facility, helping to prevent accidental or intentional evasion of the camera-based security. Portable devices 102 that are turned on after entering a secure facility (i.e., after the security desk) may escape detection by the camera disablement system of FIG. 1. While differences between the camera disablement system 100 of FIG. 1 and the continuous camera disablement system 200 of FIG. 2 are described herein, the two systems share substantially similar components and the description of FIG. 1 will not be repeated in the interest of brevity.

The continuous camera disablement system 200 may include a secure facility 202 or other geographical location with wireless coverage over a substantial portion of its area. In the depicted embodiment, two base stations 204 each having a base station range 206 provide wireless coverage for the majority of the secure facility 202. The base stations 204 may form a wireless network and may utilize any type of wireless technology, including networks compliant with short-range wireless technology standards such as IEEE 802.11, Bluetooth, RFID, ZigBee, or other RF standard. A camera-enabled portable device 102 that is located within the secure facility 202 with a continuous camera disablement system 200 may be within the wireless range of one or more base stations 204 while the portable device 102 is within the secure facility. In the depicted example, portable device 102 'A' is within range of two base stations 204 as portable device 102 'A' is within the base station range 206 of two separate base stations 204. Similarly, portable device 102 'B' is within range of only one base stations 204 but remains in wireless contact. Portable device 102 'C' is located outside the range of any base stations 204 (i.e., outside of any circles representing base station range 206) and is thus out of wireless contact with the security computer system 104. As portable device 102 'C' is outside of wireless contact, its user could potentially enable camera functionality (such as by turning on their camera functionality or the portable device 102 itself) and represent a security risk. To account for this, operators of secure facility 202 may provide sufficient base stations 204 to achieve complete coverage of the secure facility 202 so that a user cannot become out of range within the facility. Another solution may be to provide for a delay period in which a user cannot enable camera functionality to make it more difficult to violate security problems. Particularly sensitive areas may also have multiple base station coverage 204 in case of base station 204 failure.

The security computer system 104 with its disablement module 110 may interact with and otherwise communicate with base stations 204 and/or individual portable devices 102 via network 208 and through the wireless base stations 204. Network 208 may be any type of data communications channel or combination of channels, such as the Internet, an intranet, a LAN, a WAN, an Ethernet network, a wireless network, a proprietary network, or a broadband cable network. In one embodiment, network 208 includes a corporate LAN in a secure facility 202 combined with a wireless network that facilitates communication between portable devices 102 and the security computer system 104. In another embodiment, the security computer system 104 may be remote and network 208 may include the Internet along with a wireless network. Those skilled in the art will recognize, however, that the invention described herein may be implemented utilizing any type or combination of data communications channel(s).

During operation, a continuous (or near-continuous) wireless footprint may be implemented across the secure facility 202 via one or more base stations 204. The area covered by the sum of the base station ranges 206 (i.e., the continuous wireless footprint) may be known as the disablement area. The wireless signal may indicate to any portable device 102 active within the facility that its camera functionality must be disabled. Camera-enabled portable devices 102 would, upon detection of the signal, alert the user that disablement has been requested, allowing the user the opportunity to grant or deny permission to disable the camera functionality. If the user granted permission to disable, the portable device 102 may then disable its camera. If the user refused permission or did not respond, appropriate security personnel could be notified via either the base stations 204 or security computer system 104 so that normal security precautions with human staff could ensue. The portable device 102 may enable camera functionality once the user exited the secure facility 202, at which time the wireless network would no longer be detectable or fall in strength below a certain threshold. As described previously, a delay in enablement may be configured so that temporary or inadvertent lapses in wireless signal strength do not cause unintended enablement.

In some embodiments, the base stations 204 may emanate the disablement signal and each portable device 102 may interpret the signal, seek permission to disable from the user, and perform the disabling of camera functionality. In this embodiment, the base station 204 may notify security personnel at a security computer system 104 or other location in the event of inappropriately enabled portable device 102. In other embodiments, the security computer system 104 may play a larger role and the camera disablement module 110 may 'negotiate' permission with the portable devices 102 itself, providing a more robust security system that relies less upon processing at the portable devices 102. One of ordinary skill in the art will recognize, however, that the continuous camera disablement system 200 may be configured in any fashion that allows for portable devices 102 to receive an indication that disablement is desired and for some form of user consent.

The continuous camera disablement system 200 may provide for a variety of partial disablements that result in a gradient of implementations. For example, a particular base station 204 may have a 'stronger' signal that prevents any photographs from being taken, while other base stations 204 in the secure facility 202 has a 'weaker' signal that allows for lower resolution pictures. In another example, the system 200 may apply a gradient so that a user is allowed to take photographs but only at a certain financial cost. The user in this example may then be prompted with a charge only if and when she wanted to either use the camera or to save the photograph once taken.

Figure 3:
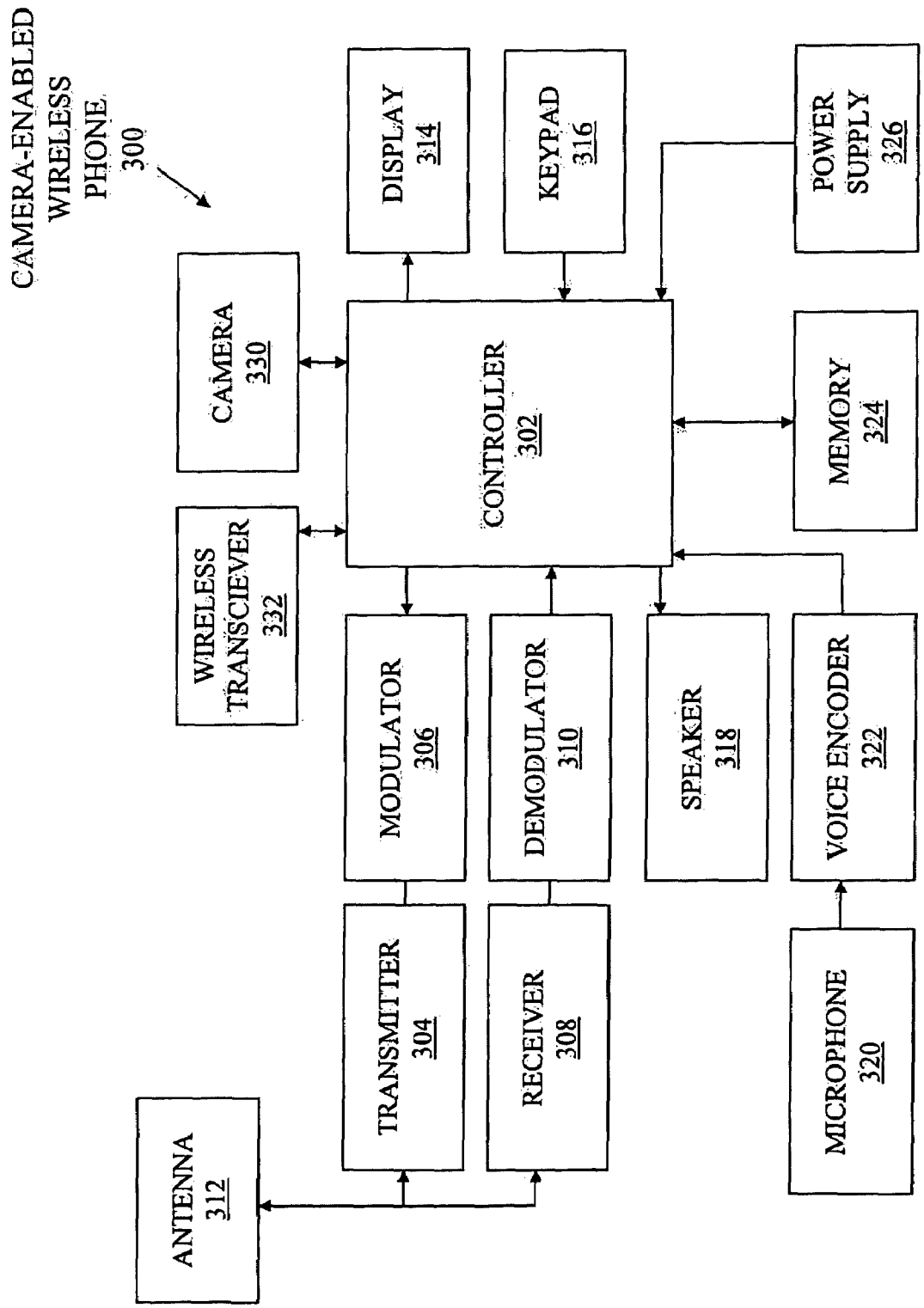
FIG. 3 depicts a block diagram of one embodiment of a camera-enabled wireless phone for use as a portable device.

FIG. 3 depicts a block diagram of one embodiment of a camera-enabled wireless phone for use as a portable device 102. The camera-enabled wireless phone 300 of FIG. 3 is an exemplary embodiment, and one of ordinary skill in the art will recognize other designs may also be suitable, including those designs having capabilities other than those ascribed herein and possibly beyond those capabilities. In the depicted embodiment, the wireless phone 300 includes a controller 302, a transmitter 304, a modulator 306, a receiver 308, and demodulator 310, an antenna 312, a display 314, a keypad 316, a speaker 318, a microphone 320, a voice encoder 322, memory 324, a power supply 326, a camera 330, and a wireless transceiver 332. The controller 302 may facilitate communication between components of the wireless phone 300, as well as providing communication to the transmitter 304 and from the receiver 308. The controller 302 may include one or more processors to execute instructions, such as an IBM® PowerPC™ processor, an Intel Pentium® processor, an Advanced Micro Devices Inc. processor, a Motorola, Inc. processor, or any other suitable processor. Controller 302 may access and/or store information in memory 324, which may be one or more volatile and/or non-volatile memory modules, such as such as RAM or double data rate (DDR) synchronous dynamic random access memory (SDRAM) modules. In some embodiments, the controller 302 may execute instructions to perform functions of the portable device 102 while all or part is stored in memory 324. The wireless phone 300 may also have a power supply 326, such as a battery or vehicle power, to provide electrical power to components of the wireless phone 300.

The controller 302 may provide signals to the transmitter 304 through a modulator 306 for transmission by antenna 312. Modulator 306 may modulate signals from the controller 302 for transmission by varying a signal to carry information. Similarly, signals received by the receiver 308 through antenna 312 may be provided to the controller 302 through a demodulator 310. Demodulator 310 may demodulate received signals and provide the demodulated signals to the controller 302. In some embodiments, the signals may be in accordance with an air interface standard associated with the wireless communication network 108. Antenna 312 may be an external or internal antenna (such as external antenna 114 of FIG. 1) adapted to facilitate communication between the wireless phone 300 and the wireless communication network 108. In some embodiments, antenna 312 may facilitate communication between the wireless phone 300 and a base site or base station of a wireless communication network 108. A base station may forward messages to and from the wireless phone 300, including voice messages to and from a telephone network.

A user interface for receiving information from a user and providing information to a user includes the display 314, keypad 316, speaker 318, microphone 320, and voice encoder 322. Display 314 may provide visual information to a user via, for example, a liquid crystal display (LCD) screen. A user may input information via a keypad 316 or other input device, such as a joystick, buttons, levers, or other input devices. A user may speak into a microphone 320 or other transducer device of the wireless phone 300 to speak commands, alphabetic phone numbers, or engage in conversation. The microphone 320 may output to a voice encoder 322 (also known as a vocoder) that, in turn, encodes voice signals and provides the encoded signal to the controller 302 for translation or other processing.

Camera 330 may include one or more device to record images, such as a digital camera for recording photographs or video. Camera 330 may store recorded images in memory located in camera 330 or in, for example, memory 324. Camera 330 may optionally include hardware and/or software to turn off its functionality upon request. In some embodiments, for example, camera 330 may include hardware to block the lens or light path to prevent use of the camera 330. In other embodiments, the operation system of a portable device 102 may have specific control mechanisms for the embedded camera 330, such as a software semaphore to turn the camera 330 on and off. Wireless transceiver 332 may transmit and receive signals from another wireless transceiver, such as a base station 204 of FIG. 2 or the security computer system of FIG. 1. The wireless transceiver 332 may utilize any type of wireless technology, such as short-range wireless technology standards such as the IEEE 802.11, Bluetooth, RFID, ZigBee or other RF standard. In some embodiments, the camera 330 and wireless transceiver 332 may be physically located very close to each other, so any attempt to provide shielding of the wireless transceiver 332 (such as RF shielding) in attempt to smuggle the wireless phone 300 will also likely result in blockage of the field of view of the camera 330.

Figure 4:
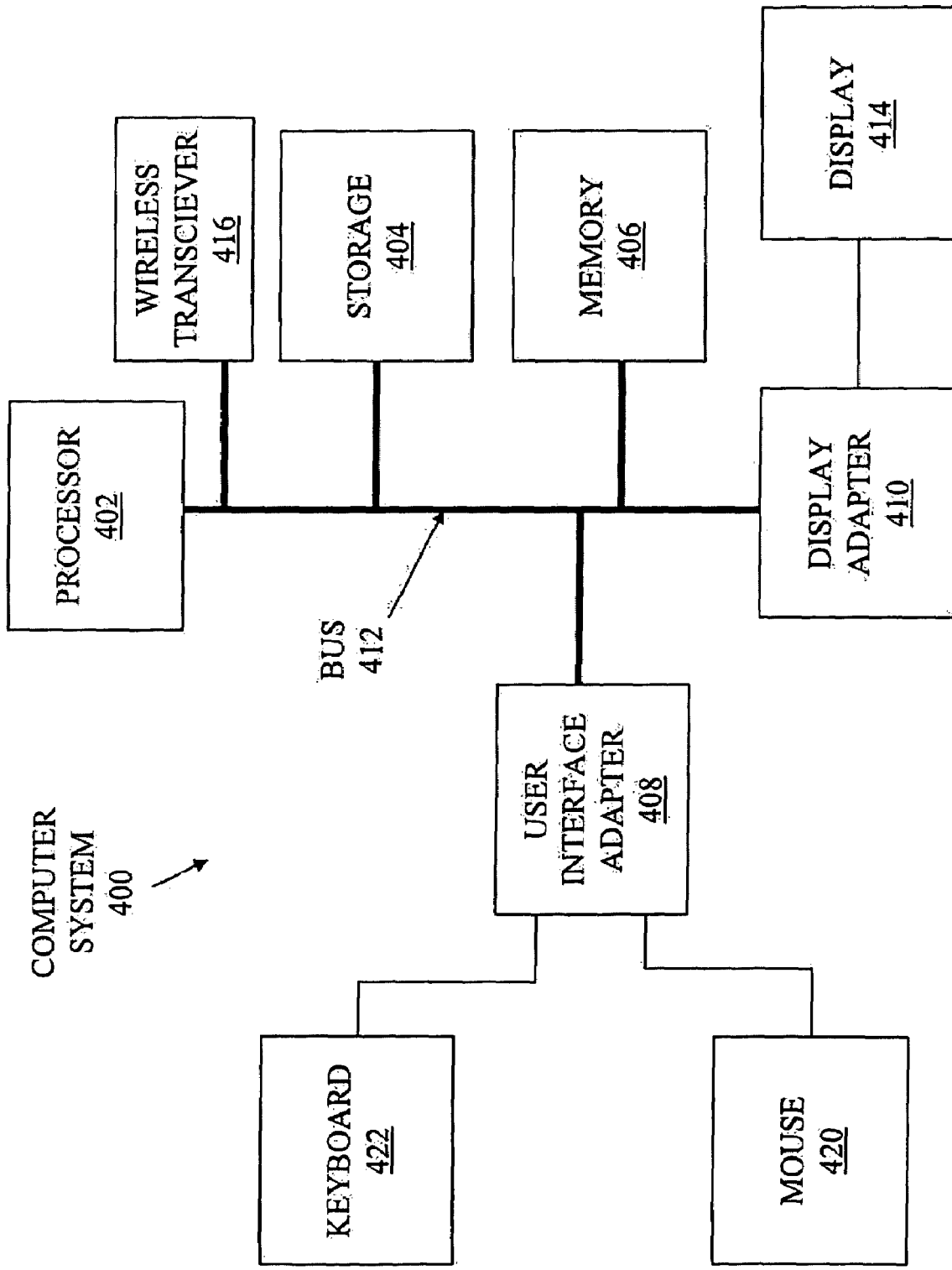
FIG. 4 depicts a block diagram of one embodiment of a computer system suitable for use as a component of the camera disablement system or continuous camera disablement system, such as a security computer system.

FIG. 4 depicts a block diagram of one embodiment of a computer system 400 suitable for use as a component of the camera disablement system 100 or continuous camera disablement system 200, such as a security computer system 104. Other possibilities for the computer system 400 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 400 may be mounted on a multi-layer planar or motherboard (which may itself be mounted on the chassis) to provide a means for electrically interconnecting the components of the computer system 400.

In the depicted embodiment, the computer system 400 includes a processor 402, storage 404, memory 406, a user interface adapter 408, a display adapter 410, and a wireless transceiver 416 connected to a bus 412. The bus 412 facilitates communication between the processor 202 and other components of the computer system 400, as well as communication between components. Processor 402 may include one or more system central processing units (CPUs) or processors to execute instructions, such as an IBM® PowerPC™ processor, an Intel Pentium® processor, an Advanced Micro Devices Inc. processor or any other suitable processor. The processor 402 may utilize storage 404, which may be non-volatile storage such as one or more hard drives, tape drives, diskette drives, CD-ROM drive, DVD-ROM drive, or the like. The processor 402 may also be connected to memory 406 via bus 412, such as via a memory controller hub (MCH). System memory 406 may include volatile memory such as random access memory (RAM) or double data rate (DDR) synchronous dynamic random access memory (SDRAM).

The user interface adapter 408 may connect the processor 402 with user interface devices such as a mouse 420 or keyboard 422. The user interface adapter 408 may also connect with other types of user input devices, such as touch pads, touch sensitive screens, electronic pens, microphones, etc. The bus 412 may also connect the processor 402 to a display, such as an LCD display or CRT monitor, via the display adapter 410. Wireless transceiver 416 may transmit and receive signals from another wireless transceiver, such as the wireless transceiver of a portable device 102. The wireless transceiver 416 may utilize any type of wireless technology, such as short-range wireless technology standards such as the IEEE 802.11, Bluetooth, RFID, ZigBee, or other RF standard.

FIG. 5 depicts a conceptual illustration of software components of a camera disablement module 110 of a security computer system 104 according to one embodiment. One or more of the software components of the camera disablement module 110 may execute on a processor of a security computer system 104, such as in a processor 402 of the computer system 400 of FIG. 4. As described previously (and in more detail in relation to FIGS. 7-8), the camera disablement module 110 may interact with camera disablers 124 of one or more portable devices 102 to negotiate disablement of camera functionality of the associated portable devices 102. The camera disablement module 110 may include some or all of a camera-enabled portable device interface 502, a user permission module 504, a security alert module 506, and a disablement command generator 508.

The camera-enabled portable device interface 502 may provide for communications to and from the camera disablement module 110 and the camera disabler 124 or a camera-enabled portable device 102. Transmissions from the camera disablement module 110 through the camera-enabled portable device interface 502 may include requests for permission to disable camera functionality, commands to disable camera functionality, commands to enable camera functionality, and/or other information. Information or messages received by the camera-enabled portable device interface may include information relating to whether a user of the portable device 102 granted or refused permission to disable camera functionality, confirmation of disablement, an indication that camera functionality was enabled, and/or other information.

The user permission module 504 may, upon determination that a new camera-enabled portable device 102 is present, transmit a request (via the camera-enabled portable device interface 502) for permission to disable camera functionality to the portable device 102. The user permission module 502 may also receive and process a response from the portable device 102 via the camera-enabled portable device interface

502. If the user permission module 502 determines that the user has refused permission to disable camera functionality, it may notify the security alert module 506, which in turn may notify appropriate security personnel that the portable device 102 retains camera functionality. If the user permission module 502 determines that the user has granted permission to disable camera functionality, it may notify the disablement command generator 508, which in turn may generate and transmit a disablement command for transmission to the portable device 102 via the camera-enabled portable device interface 502 to disable camera functionality on the portable device 102. The disablement command may include one or more of a command to disable camera functionality for a prescribed period, a command to disable camera functionality while the portable device is located within a secure geographical location, a command to partially disable camera functionality, or a command to fully disable camera functionality. In some embodiments, the disablement command generator 508 may also generate and transmit commands to enable camera functionality, such as in response to a user returning to a security desk upon leaving a facility to reactivate their portable devices 102. In an alternative embodiment, the disablement command generator 508 may generate and transmit a disablement command simultaneously with the request for permission (or otherwise before receiving explicit indication of permission), allowing the portable device 102 to disable the functionality after receiving permission without having to wait until receiving a later command.

FIG. 6 depicts a conceptual illustration of software components of a camera disabler 124 of a portable device 102 according to one embodiment. One or more of the software components of the camera disabler 124 may execute on a processor of a portable device 102, such as in a controller 302 of the camera-enabled wireless phone 300 of FIG. 3. As described previously (and in more detail in relation to FIG. 9), the camera disabler 124 may receive an indication that camera functionality disablement is required (such as from a security computer system 104 or a base station 204) and may inquire of its user whether the user grants or refuses permission for disablement of camera functionality. The camera disabler 124 may then, in response to the user, may disable camera functionality and/or transmit a negative response to the security computer system 104 and/or base station 204. The camera disabler 124 may include a security computer system interface 602, a user interface module 604, and/or a camera padlock module 606.

The security computer system interface 602 may provide for communications to and from the camera disablement module 110 (and its camera-enabled portable device interface 502) of a security computer system 104 according to some embodiments. Transmission from the security computer system interface 602 may include information relating to whether a user of the portable device 102 granted or refused permission to disable camera functionality, confirmation of disablement, an indication that camera functionality was enabled, and/or other information. The security computer system interface 602 may also receive information from a security computer system 104, such as requests for permission to disable camera functionality, commands to disable camera functionality, commands to enable camera functionality, and/or other information. In other embodiments, the security computer system interface 602 may communicate with the security computer system 104 indirectly via a base station 204 or may communicate with only a base station 204 (such as receiving disablement signals).

The user interface module 604 may interact with the user of the portable device 102, such as by receiving input from the keypad 316 or by providing information via display 314 of the camera-enabled wireless phone 300 of FIG. 3. The user interface module 604 may receive user input such as indications that the user granted or refused permission that the user input via a voice command or keypad entry. The user interface module 604 may also display a user interface to the user providing information such as a request for permission to disable functionality, a current status (e.g., time left for disablement, whether the camera functionality is currently disabled, etc.), or a request to report to security personnel.

The camera padlock module 606 may perform the actual disablement or enablement of the camera functionality (such as camera 330) upon request of the security computer system 104, the user interface module 604, or other component. In some embodiments, the camera padlock module 606 may utilize a simple software semaphore to disable camera functionality. In other embodiments, the camera padlock module 606 may command a hardware function to disable the camera, such as by blocking a lens or light path or removing power to the camera 330. The camera padlock module 606 may also transmit a confirmation of camera disablement to the security computer system 104 or other component via the security computer system interface 602.

Figure 7:
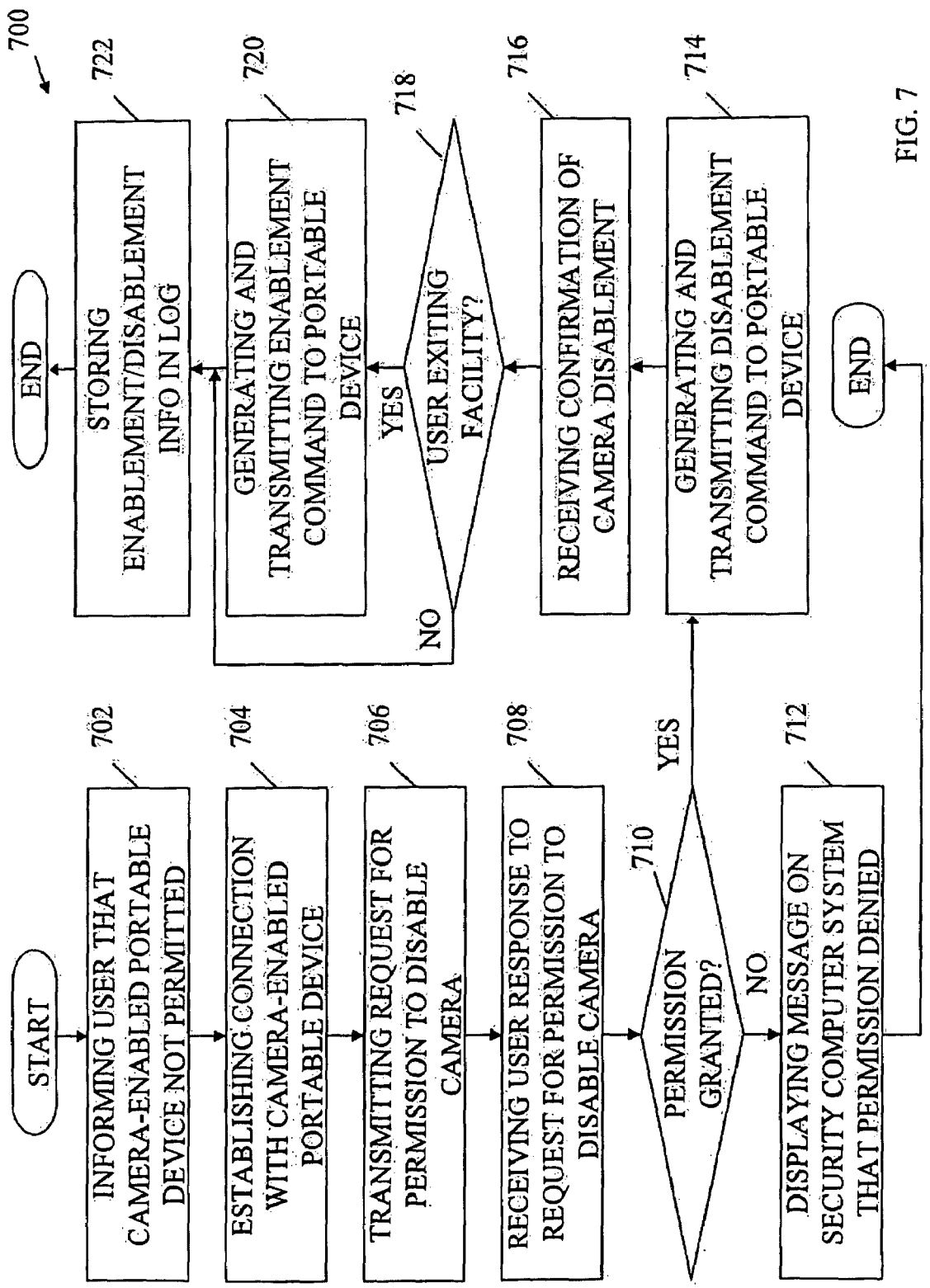
FIG. 7 depicts an example of a flow chart for negotiating permission with a user and disabling camera functionality of a portable device according to one embodiment.

FIG. 7 depicts an example of a flow chart 700 for negotiating permission with a user and disabling camera functionality of a portable device 102 according to one embodiment. Elements of the method of flow chart 700 may be performed, in one embodiment, by a security computer system 104 and its components, such as a camera disablement module 110. The method of flow chart 700 corresponds with the camera disablement system 100 of FIG. 1. Flow chart 700 begins with optional element 702, where security personnel may inform a user of a camera-enabled portable device 102 that cameras are not permitted, such as via a sign, verbal instructions, etc. A security guard may, for example, stop a user at a security desk to sign in before entering a secure facility and may also notify the user that cameras are not permitted and that the user may agree to disablement or turn in their portable device 102. If the user verbally agrees with disablement, the camera disablement module 110 may then establish a connection with the camera-enabled portable device 102 at element 704, such as via a wireless connection 106, a wired link (e.g., a USB cable connecting the security computer system 104 and portable device 102, etc.), or other means. In some embodiments, element 702 is not necessary and a security computer system 104 may automatically establish a connection with a portable device 102 entering a secure facility.

After establishing a connection, the camera disablement module 110 may transmit a request for permission to disable the camera functionality of the portable device 102 at element 706. The request for permission may include an identity of the requesting entity to provide assurances to the user that the request is genuine. The camera disablement module 110 may then receive at element 708 an indication of the user response to the request for permission to disable camera functionality after the portable device 102 determines such response and replies to the security computer system 104 and its camera disablement module 110. The user response may include an identification of the user and/or portable device 102 in addition to the indication of the user's response relating to the permission. At decision block 710, the user permission module 504 of the camera disablement module 110 may optionally analyze the indication of the user response to determine whether the user granted or refused permission. If the user denied or refused permission to disable camera functionality (or failed to respond in a timely manner), the method may continue to element 712, where the security alert module 506 of the camera disablement module 110 may notify security personnel that the user denied permission (after which the method terminates), such as by displaying a message on the security computer system 104, e-mailing or otherwise contacting security personnel, or other means.

If the user granted permission to disable camera functionality, the method may continue to element 714, where the disablement command generator 508 may generate and transmit (via the camera-enabled portable device interface 502) a disablement command to the portable device 102. In some embodiments, the disablement command may command that the camera functionality be turned off for a prescribed period, such as a period based on how long the user is authorized to be in the secure facility. In other embodiments, the disablement command may command that camera functionality be turned off indefinitely or until the user requests reactivation (per element 722). In some alternative embodiments, the disablement command may only command partial disablement of camera functionality, such as by limiting the ability of the portable device 102 to record images, reducing the resolution or quality of recorded images, etc. In yet other alternative embodiments, the camera disablement module 110 may transmit the disablement command before receiving permission along with the request to disable, eliminating the need to wait for a user response or to send two transmissions. The camera disablement module 110 may optionally at element 716 receive confirmation that the camera functionality of the portable device 102 was actually disabled. In some embodiments, the portable device 102 does not send confirmation of the disablement.

Camera functionality should remain disabled while the user is in the secure facility. If the user leaves earlier than anticipated and their camera functionality was disabled for a prescribed period, they may simply wait until the period passes and their fully functionality will be automatically reinstated. If the user decides at decision block 718 to return to the security desk to have their functionality enabled, the disablement command generator 508 of the camera disablement module 110 may at element 720 generate and transmit an enablement command to the portable device 102 to end the disablement. The security computer system may optionally reestablish a connection with the portable device 102 upon the user's return to the security desk.

The camera disablement module 110 of the security computer system 104 may also store information relating to the usage of the camera functionality of the portable device 102 in a log at element 722, after which the method terminates. The information may include an identification of the user and/or portable device 102, a time and manner of disablement of camera functionality, a time and manner of any enablement of camera functionality, a record of a usage of the camera functionality in the event that the disablement was partial, etc. Recording of information in a log may optionally occur at any time during the method of flow chart 700, such as immediately after recordable events. Recording of camera 330 usage may be particularly useful for facilities that wish to charge for usage of camera functionality. Commercial facilities (e.g., concert venues, museums, etc.) in particular may wish to charge for usage and fully or partially disable portable devices 102 of users who do not pay.

Figure 8:
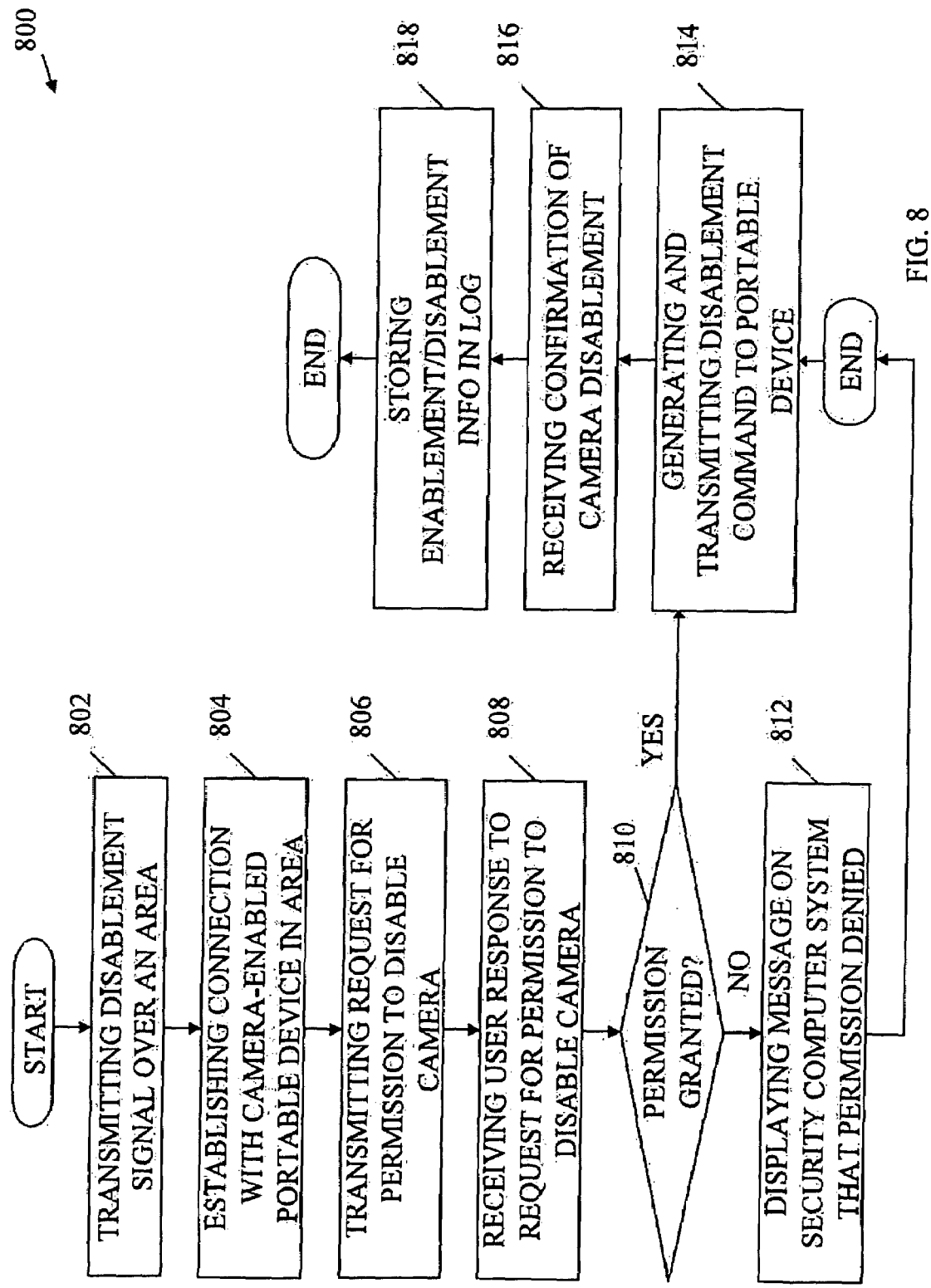
FIG. 8 depicts an example of a flow chart for establishing a disablement area for negotiating permission with a user and disabling camera functionality of a portable device according to one embodiment.

FIG. 8 depicts an example of a flow chart 800 for establishing a disablement area for negotiating permission with a user and disabling camera functionality of a portable device 102 according to one embodiment. The method of flow chart 800 corresponds with the camera disablement system 200 of FIG. 2. Elements of the method of flow chart 800 may be performed, in one embodiment, by components of a continuous camera disablement system 200, such as a security computer system 104 and its components or one or more base stations 204. Certain elements of flow chart 800 may be substantially similar to those of flow chart 700 and their descriptions will not be repeated in their entirety in the interest of brevity. Flow chart 800 begins with element 802, where one or more base stations 204 may transmit a disablement signal over an area. The disablement area may correspond to the area with a secure facility 202 so that, in an optimal configuration, the entire area of the secure facility is within base station range 206 of one or more base stations 204. If a camera-enabled portable device 102 enters within a base station range 206 of a base station 204 (or is turned on while in a base station range 206), the base station 204 and/or security computer system 104 may then establish a connection with the camera-enabled portable device 102 at element 804.

The security computer system 104 may have primary responsibility for negotiating disablement in some embodiments, utilizing base stations 204 for purposes of communication with the portable devices 102. In these embodiments and after establishing a connection, the camera disablement module 110 of the security computer system 104 may transmit a request for permission to disable the camera functionality of the portable device 102 at element 806. The camera disablement module 110 may then receive at element 808 an indication of the user response to the request for permission to disable camera functionality after the portable device 102 determines such response and replies to the security computer system 104 and its camera disablement module 110. At decision block 810, the user permission module 504 of the camera disablement module 110 may optionally analyze the indication of the user response to determine whether the user granted or refused permission. If the user denied or refused permission to disable camera functionality (or failed to respond in a timely manner), the method may continue to element 812, where the security alert module 506 of the camera disablement module 110 may notify security personnel that the user denied permission (after which the method terminates), such as by displaying a message on the security computer system 104, e-mailing or otherwise contacting security personnel, or other means.

If the user granted permission to disable camera functionality, the method may continue to element 814, where the disablement command generator 508 may generate and transmit (via the camera-enabled portable device interface 502) a disablement command to the portable device 102 using a base station 204. The camera disablement module 110 may optionally at element 816 receive confirmation that the camera functionality of the portable device 102 was actually disabled. The camera disablement module 110 of the security computer system 104 may also store information relating to the usage of the camera functionality of the portable device 102 in a log at element 818, after which the method terminates.

Camera functionality should remain disabled while the user is in the secure facility 202 and within range of a base station 204. If the user leaves the facility, the base stations 204 will no longer be detectable and the portable device 102 may then enable camera functionality. A lag time may be built in so that power interruptions, small dead spots in base station 204 coverage while a user is traversing the facility, etc., do not allow users to inappropriately use their camera functionality.

In an alternative embodiment, the security computer system 104 need not have primary coverage and the base stations 204 may provide full interaction with the portable devices 102. In this embodiment, a base station 204 may have a camera disablement module 110 or some or all of its functionality. This embodiment may be particularly useful when a straightforward 'disablement web' is transmitted over a secure facility 202 so that no detailed negotiation is necessary. In this embodiment, the base station 204 may notify a remote security computer system 104 or other security in the event that a user refuses to disable camera functionality.

Figure 9:
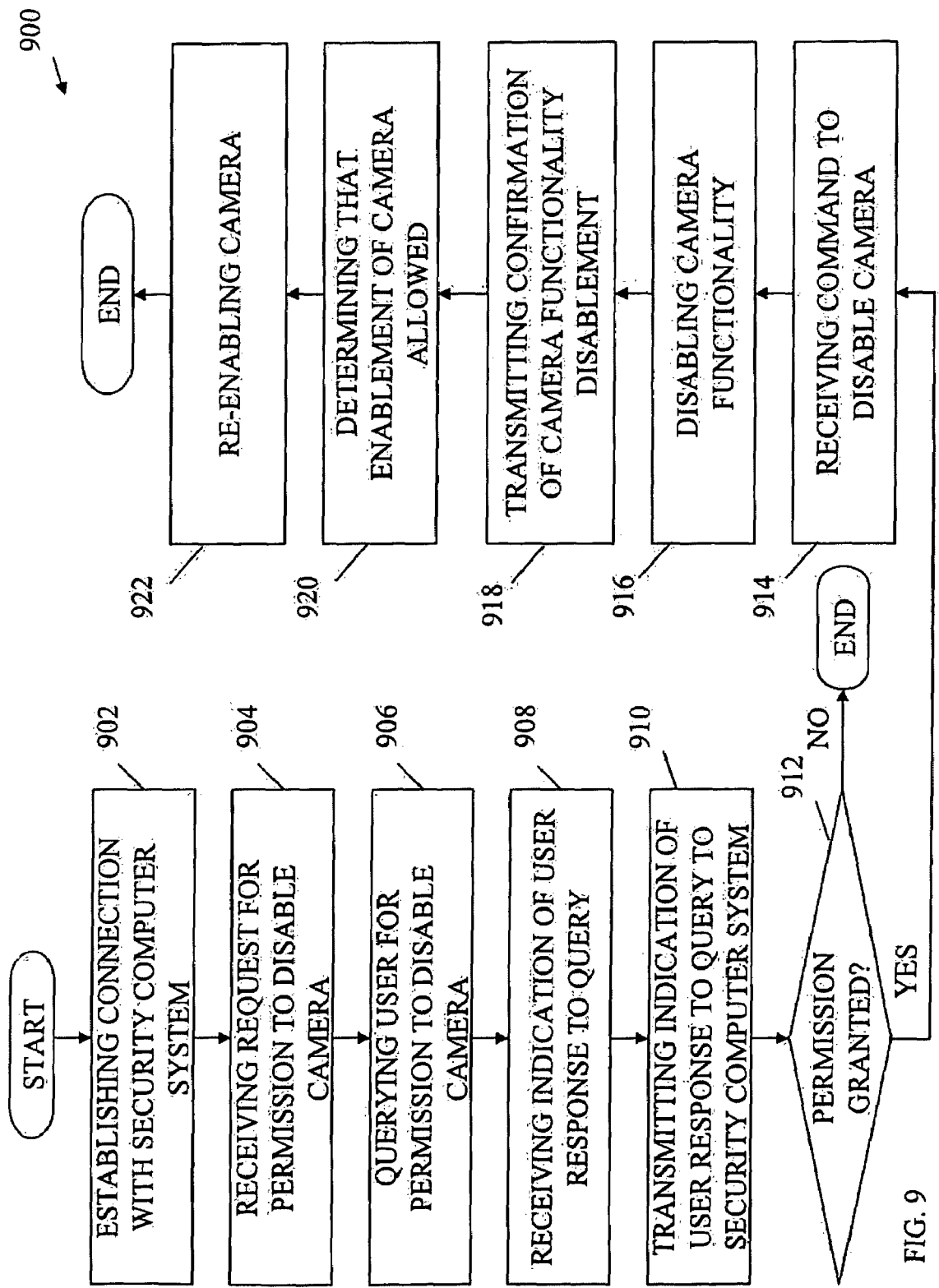
FIG. 9 depicts an example of a flow chart for receiving a request to disable camera functionality and disabling such functionality in response to user consent according to one embodiment.

FIG. 9 depicts an example of a flow chart 900 for receiving a request to disable camera functionality and disabling such functionality in response to user consent according to one embodiment. Elements of the method of flow chart 900 may be performed, in one embodiment, by a portable device and its components, such as a camera disabler 124. Flow chart 900 begins with element 902, where the portable device 102 and its camera disabler 124 may establish a connection with a security computer system 104 (or, alternatively, a base station 204). As described previously, the connection with the security computer system 104 may be a wired or wireless connection. The camera disabler 124 may at element 904 receive a request for permission to disable camera functionality. Upon receiving such request, the user interface module 604 may query the user of the portable device 102 for permission to disable camera functionality at element 906, such as by presenting the user with a visual or audible indication that permission is desired. The user interface module 604 may receive an indication of the user response to the query at element 908. The user response may be a full or partial grant of permission, a full or partial denial of permission, or other response. The camera disabler 124 may then transmit an indication of the user's response to the query to a security computer system 104 at element 910. If the camera disabler 124 determines at decision block 912 that the user denied permission, the method terminates; otherwise, the method may continue to element 914.

In response to permission to disable some or all of camera functionality, the camera disabler 124 may coordinate with a security computer system 104 to disable camera functionality in some embodiments. At element 914, the camera disabler 124 may receive a command to disable camera functionality from the security computer system 104. The camera padlock module 606 of the camera disabler 124 may then disable camera functionality at element 916 using software and/or hardware. Alternatively, the camera disabler 124 may proceed directly to element 916 in response to a grant of permission without having to wait for a disablement command at element 914. In this embodiment, the camera padlock module 606 may either proceed without an explicit disablement command (using the request for permission as an implied command) or may receive a disablement command at an earlier time, such as at the same time as receiving the request for permission at element 904. After disabling camera functionality, the camera disabler 124 may optionally transmit at element 918 confirmation that camera functionality has indeed been disabled.

At element 920, the camera disabler 124 may determine that enablement of camera functionality is allowed. Once determining that enablement is allowed, the camera disabler 124 may re-enable the camera functionality at element 922, after which the method terminates. The camera disabler 124 may determine at element 920, for example, that the portable device 102 is no longer within range of any disablement signals from a base station 204 (and any waiting period has passed). In another example, the camera disabler 124 may receive an enablement signal from a security computer system 104, such as when a user leaves a secure facility and returns to the security desk to have their portable device 102 functionality restored. In yet another example, the camera disable 124 may determine that the prescribed period for disablement has elapsed. In this example, the camera disabler 124 may utilize an internal clock within the portable device 102 that the user cannot access (or a network-provided time) instead of visible time so that a user could not 'fool' their portable device 102 by manually changing the time.

It will be apparent to those skilled in the art having the benefit of this disclosure that the present invention contemplates systems, methods, media, and apparatuses for disabling camera functionality in a portable device such as a mobile phone. It is understood that the form of the invention shown and described in the detailed description and the drawings are to be taken merely as examples. It is intended that the following claims be interpreted broadly to embrace all the variations of the example embodiments disclosed.

What is claimed is:

1. A computer-readable medium of a data processing system storage device containing instructions effective, when executing in the data processing system, to cause the data processing system to perform operations comprising:
   establishing a connection with a camera-enabled portable device;
   transmitting to the portable device a request for permission to disable camera functionality; and
   receiving a response from the portable device relating to permission to disable camera functionality, the received response providing an indication of whether a user of the portable device granted permission to disable camera functionality.

2. The computer-readable medium of claim 1, further comprising in response to the received response indicating the user granted permission to disable camera functionality, transmitting to the portable device a command to disable camera functionality.

3. The computer-readable medium of claim 2, wherein transmitting to the portable device a command to disable camera functionality comprises transmitting to the portable device one or more of a command to disable camera functionality for a prescribed period, a command to disable camera functionality while the portable device is located within a secure geographical location, a command to partially disable camera functionality, or a command to fully disable camera functionality.

4. The computer-readable medium of claim 1, further comprising in response to the received response indicating the user refused permission to disable camera functionality, displaying a notification message.

5. A camera disablement module apparatus for a security computer system, comprising:
   a camera-enabled portable device interface to facilitate communication to and from a camera-enabled portable device;
   a user permission module in communication with the camera-enabled portable device interface to request permission from a user of the portable device to disable camera functionality; and
   a disablement command generator in communication with the camera-enabled portable device interface to generate and transmit a command to disable camera functionality of the portable device.

6. The apparatus of claim 5, further comprising a security alert module in communication with the user permission module to notify security personnel in response to the user refusing permission to disable camera functionality.

7. The apparatus of claim 5, wherein the disablement command generator transmits a command to disable camera functionality of the portable device in response to receiving from the user permission module an indication that the user granted permission to disable camera functionality.

8. The apparatus of claim 5, wherein the disablement command generator generates and transmits a command to enable camera functionality to the portable device in response to determining that camera functionality should be enabled.

9. The apparatus of claim 5, wherein the command to disable camera functionality of the portable device comprises one or more of a command to disable camera functionality for a prescribed period, a command to disable camera functionality while the portable device is located within a secure geographical location, a command to partially disable camera functionality, or a command to fully disable camera functionality.

* * * * *